G. A. BUCKLEY.
COMBINED PLOW AND SCRAPER.
APPLICATION FILED MAY 8, 1919.
1,356,036.
Patented Oct. 19, 1920.
2 SHEETS—SHEET 1.
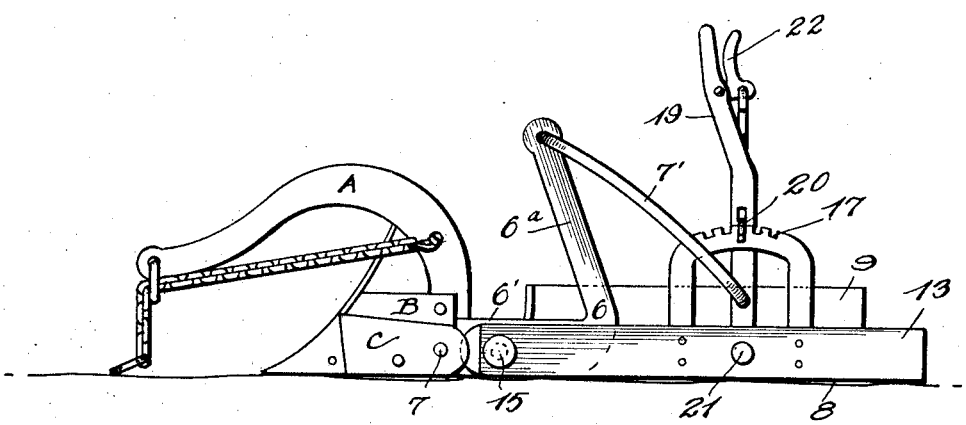
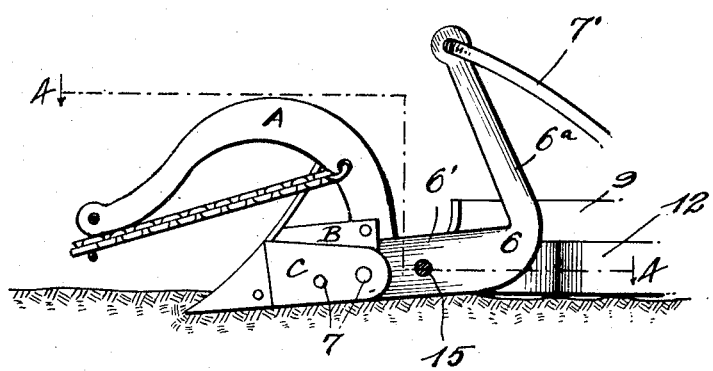
Inventor
G. A. Buckley
By H. B. Willson & Co.
Attorneys

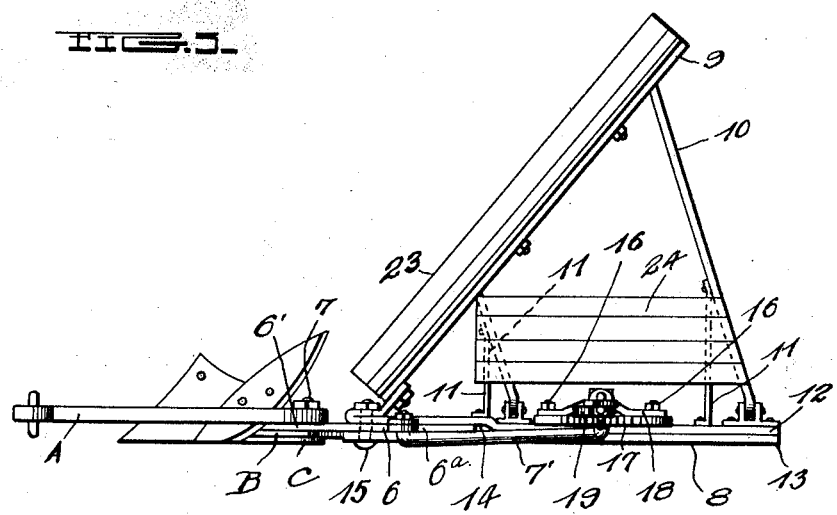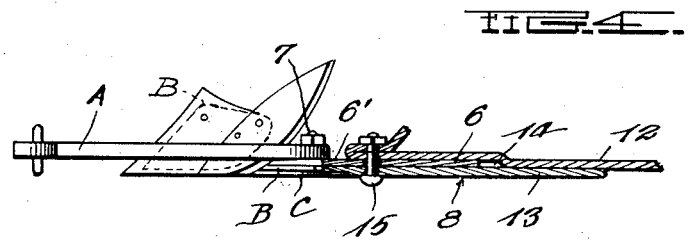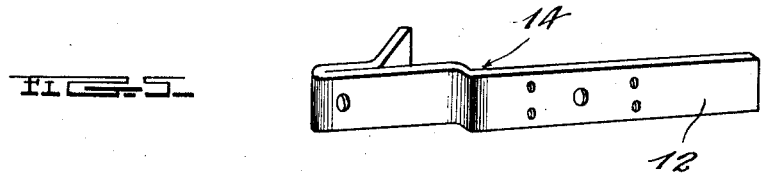

UNITED STATES PATENT OFFICE.

GEORGE A. BUCKLEY, OF ST. ANDREWS, WASHINGTON.

COMBINED PLOW AND SCRAPER.

1,356,036.

Specification of Letters Patent.    Patented Oct. 19, 1920.

Application filed May 8, 1919. Serial No. 295,529.

*To all whom it may concern:*

Be it known that I, GEORGE A. BUCKLEY, a citizen of the United States, residing at St. Andrews, in the county of Douglas and State of Washington, have invented certain new and useful Improvements in Combined Plows and Scrapers; and I do declare the following to be a full, clear and exact description of the invention, such as will enable others skilled in the art to which it appertains to make and use the same.

This invention relates to plows and scrapers, and it relates more specifically to an improved combined plow and scraper.

One object of the invention is to generally improve upon devices of this character by providing a structure that is exceedingly convenient, efficient, strong, durable, compact and comparatively inexpensive.

Another object is to provide an improved scraping device which is attachable to a turning plow of ordinary construction without materally changing the plow.

Other objects and advantages may become apparent to persons who read the following details of description in connection with the accompanying drawings in which:—

Figure 1 is a left side elevation of my improved scraper attachment united with a plow of ordinary construction.

Fig. 2 is a left side elevation of the plow and the front portion or connecting element of the scraper attachment.

Fig. 3 is a top plan view of the combined plow and scraper.

Fig. 4 is a horizontal sectional view, the section being along the line 4—4 of Fig. 2.

Fig. 5 is a perspective view of one of the bars which are united and form the runner which carries the scraper-blade.

Referring to these drawings in detail, in which similar reference characters correspond with similar parts throughout the several views, and in which the plow may be of ordinary construction, comprising a combined stock and beam A and a base, the latter including a frog B and a landside C.

The invention comprises a substantially L-shaped lever 6 having one of its arms rigidly united with the plow by means of bolts 7 which secure the landside, frog and stock of the plow together, it being understood however, that additional bolts or fastening means may be employed for keeping the parts A, B and C together when the bolts 7 are removed for attaching the lever 6, also that any appropriate means may be employed for rigidly uniting the lever 6 with the base of the plow in the position shown. The lever 6 has its lower edge substantially even or in alinement with the lower edge of the landside and extends a considerable distance rearwardly of the landside or base of the plow. This lever comprises a forwardly extending arm 6' and an upwardly extending arm 6ª, the latter having a link 7' pivotally connected thereto for a purpose which will presently appear.

The scraper frame comprises a runner 8, a scraper bar 9, a brace bar 10 and auxiliary brace bars 11. The runner 8 is preferably formed of two bars 12 and 13, the latter having its left side substantially in the same vertical plane with the left side of the landside, so as to constitute a rearward extension of the landside. The rear and intermediate portions of the bars 12 and 13 are parallel and contact with one another, but their front ends are separated to form a space 14 into which the rear end of the arm 6' extends, and a bolt 15 extends through the intermediate portion of the arm 6' and through the front ends of the bars 12 and 13 so as to pivotally connect the arm 6' to the runner 8. It will be seen that the vertical sides of the arm 6' are in contact with the inner vertical sides of the bars 12 and 13, so that the arm 6 is securely held against horizontal movement, but is permitted to swing vertically on the pivot 15 so that the plow is adjustable with relation to the runner or frame element 8. The pivot or bolt 15, therefore, serves to unite the front ends of the bars 12 and 13, and bolts 16 serve to unite their rear end portions. The bolts 16 also serve to secure a segmental rack 17 and a keeper or bar 18 to the runner 8, the latter having its ends disposed on opposite ends of the rack 17 and providing a space between itself and the runner 8 to receive the lower end of an adjusting lever 19 which is provided with a spring-pressed pawl 20 for engagement with teeth of the rack 17. The pivotal connection of the lever 19 with the runner 8 is indicated at 21 in Fig. 1, and it will be seen that the link 7' is pivotally connected to the lever 19. It will be seen, therefore, that by pressing a pawl-actuating lever 22 so as to raise the pawl 20 out of engagement with the rack 17, the lever 19 may be swung backward or forward and thereby swing the lever 6 on its pivot 15. When the lever 19 is swung forward, the front end of the plow is moved downward so that the plow enters the earth more deeply, and this also draws the front end of the scraper blade 23 downward and causes it to go deeper into the earth. However, when the lever 19 is swung rearward from its central position, the front part of the plow is pointed upward and the rear end of the arm 6' extends below the lower edge of the runner 8, thereby not only elevating the plow point, but also elevating the front end of the scraper-blade. Moreover, the lever 19 and upstanding segment 17 form a rigid means whereby the plow and scraper may be turned or adjusted laterally so as to cause the outer end of the scraper blade to pass by a rock, stump or other obstruction, and moreover the lever 19 serves to cause the scraper blade to go deeper or less deeper, in a manner which will presently appear. Upon the brace rods 11, a platform 24 is secured, and upon this platform the driver or operator stands in a convenient position to manipulate the lever 19. It will be seen that when he leans leftward against the lever, this will to some extent offset the weight of the scraper blade and tend to raise the scraper blade, but if the operator leans toward the right while holding to the lever 19, this will tend to make the scraper blade go deeper into the ground.

From the foregoing description, it will be seen that my scraping device is a compact, unitary structure which may be quickly and easily attached to a turning plow of ordinary construction, and which unites with the turning plow to form a device which is very useful in making and repairing roads and for grading, ditching and leveling ground for various purposes.

I claim:

1. The combination of a plow comprising a frog, a lever rigidly united with said frog and extending rearward therefrom, a runner pivoted to and extending rearward from said lever, a scraper-blade carried by said runner, and means coacting with said lever to secure the plow in different adjustments about the pivot that connects said lever to said runner.

2. The combination of a plow comprising a landside, a runner pivotally connected to the plow in a position to form a rearward extension of the landside, a scraper-blade carried by the rearward extension of the landside and means to secure the plow in different adjustments about the pivot that connects the plow to the runner or landside extension.

3. The combination of a plow, a lever rigidly united with the base of the plow and comprising a horizontal portion and an upright portion, a runner pivotally connected to the horizontal portion of said lever, adjusting means connected to the upright portion of the lever and including an upright adjusting lever which is operable to tilt the plow with relation to the runner and to tilt the runner and plow laterally, and a scraper-blade carried by said runner and adjustable therewith by said adjusted lever, substantially as described.

4. The combination of a plow, a lever rigidly united with the base of the plow and extending rearward therefrom, a runner comprising two bars rigidly united and having their rear ends engaged with opposite vertical surfaces of said lever and being pivoted thereto by a horizontal pivot at a point rearward of the front end of said lever, a scraper-blade carried by said runner, and means on said runner to actuate said lever and thereby tilt the plow upward and downward.

5. A scraping attachment for a plow, comprising a lever attachable to the base of a plow, a runner pivotally connected to said lever, a scraper blade carried by said runner, and means on said runner to adjust said lever with relation to said runner.

In testimony whereof I have hereunto set my hand in the presence of two subscribing witnesses.

GEORGE A. BUCKLEY.

Witnesses:
 CARL JESPERSEN,
 B. BUCKLEY.